United States Patent Office 3,357,473
Patented Dec. 12, 1967

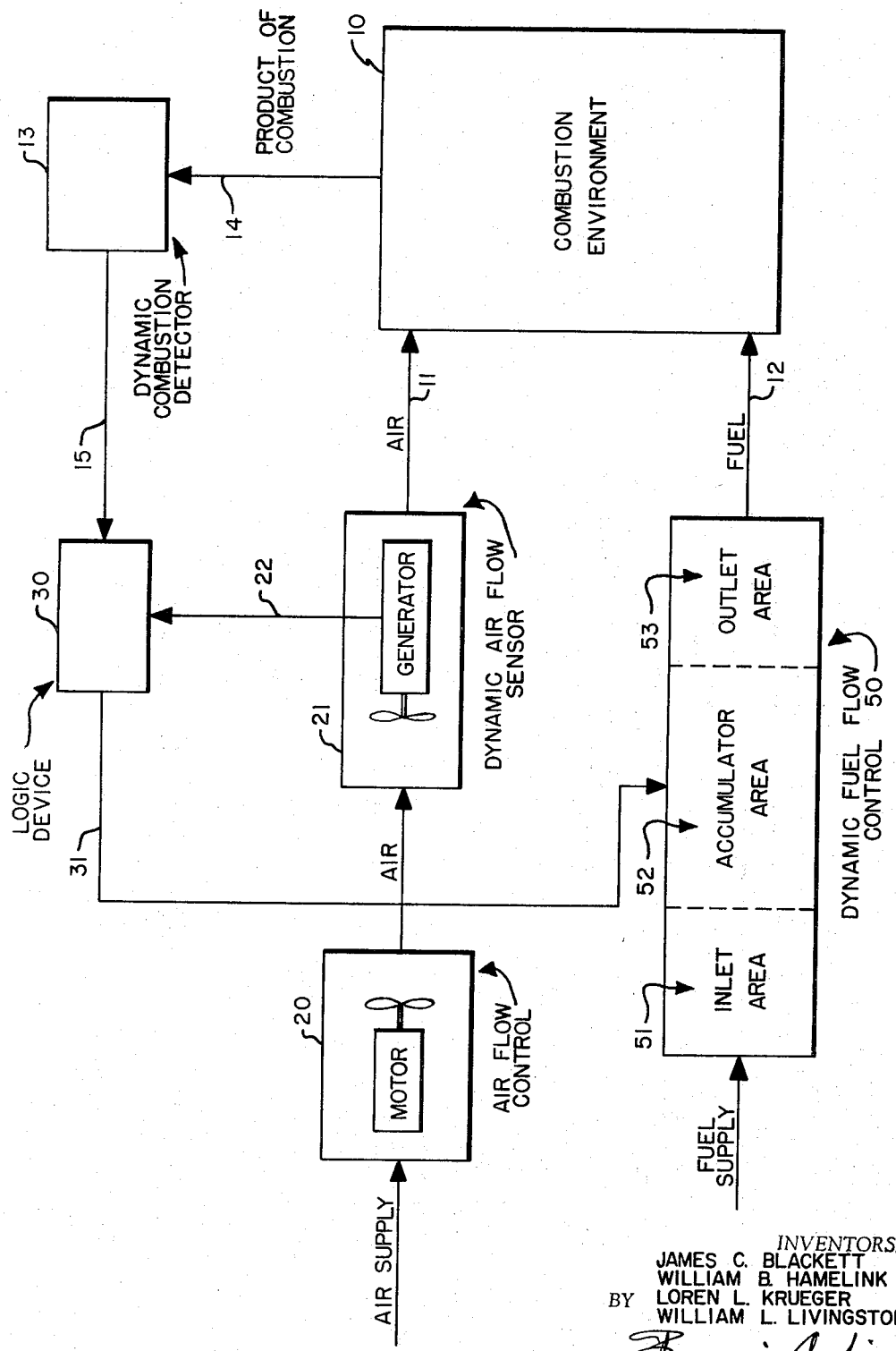

3,357,473
CONTROL SYSTEM
James C. Blackett, Rosemount, William B. Hamelink, Richfield, and Loren L. Krueger, Minnetonka, Minn., and William L. Livingston, Sharon, Mass., assignors to Honeywell Inc., Minneapolis, Minn., a corporation of Delaware
Filed Sept. 6, 1966, Ser. No. 577,416
6 Claims. (Cl. 158—28)

ABSTRACT OF THE DISCLOSURE

A combustion system having dynamic means to reliably sense air flow to a combustion environment, dynamic means to reliably sense the presence of combustion at the combustion environment, a logic device which must respond to both the air flow sensor and the combustion sensor to provide dynamic control of a dynamic fuel flow control to reliably move fuel to the combustion environment.

---

Our invention is concerned with a control system, and particularly with a control system wherein the continued flow of a hazardous reactant to an existing reaction is controlled in a fail-safe manner.

Control systems are made up of structural elements or building blocks which are interconnected to receive, utilize and then transmit control information to other elements, the output of the system being some form of control. Our invention utilizes elements or building blocks which are reliable, that is, if they work at all, they work only to give a specific desired result. Also these building blocks are interconnected so that transmission of control information is reliable—it works only one way, or not at all. Any failure of an element or of the transmission of control information produces a failure which is safe, that is, the failure can be tolerated.

In order to accomplish our invention, it is necessary that all elements of the control system be dynamic elements, which may include static elements operated in a dynamic mode. Dynamic elements are those which must continuously respond to an input control stimulus in order to provide a dynamic output which is trustworthy—that is, an output which can be trusted to indicate that the control stimulus does in fact exist. For example, a thermocouple is a dynamic element since it must continuously respond to an input control stimulus (heat) in order to provide a dynamic output (voltage), and this output is trustworthy (it is impossible for the voltage to exist in the absence of heat).

A relay is an example of a static device. In usual practice a relay is intended to respond to a future event. The relay is energized upon the closing of a switch and remains energized in a static condition waiting for the switch to open. However, the static device may not respond when the switch opens. When a relay is operated in a dynamic mode, it becomes a dynamic element. The dynamic mode may be established by means of a cyclic input control stimulus which causes the relay armature to continuously cycle between the energized and deenergized conditions. The dynamic output is the cycling state of the armature and this output is trustworthy.

We show our invention utilized in a novel combustion system wherein the existing reaction is a combustion environment and wherein the hazardous reactant is fuel. A non-hazardous reactant, air, is also supplied to the existing reaction, and the continuous presence of the existing reaction is monitored.

Our invention utilizes a dynamic air flow sensor to provide a dynamic output if air flows to a combustion environment. Associated with the combustion environment is a dynamic combustion detector which responds to a product of combustion and provides a dynamic output so long as combustion is present. The output of the combustion detector and the air flow sensor are combined in a logic device to control a dynamic fuel flow control and to move fuel to the combustion environment only so long as air continues to flow, only so long as combustion is present, and only so long as all system components remain dynamic.

The single figure shows a preferred embodiment of our invention wherein reference numeral 10 designates a combustion environment having air 11 and fuel 12 supplied thereto. The air and the fuel combine within the combustion environment to form a combustible mixture and this mixture is ignited by means of the combustion taking place within environment 10. We have elected not to show the initial means of establishing combustion in this environment—this may be done manually.

Reference numeral 13 designates a dynamic combustion detector which responds to a product of combustion 14. For example, combustion detector 13 may be of the type disclosed in the W. G. Rowell Patent 2,798,213. This patent discloses a dynamic detector which provides a continuously changing output 15 so long as combustion is present at combustion environment 10.

For example, combustion detector 13 may be provided with output-to-input control such that the detector is first sensitive to the products of combustion. When the products of combustion are successfully detected by detector 13, the absence of the products of combustion is artificially simulated by output-to-input control, causing this simulated absence of combustion to be detected. In this manner, output 15 is a cyclic "on-off" output so long as combustion is present. Any failure causing static output provides an indication that combustion is no longer present, or that detector 13 has failed and can no longer detect in a dynamic fashion.

The flow of air to combustion environment 10 is instituted by air flow control 20, for example, a fan driven by a motor. This air moves to the combustion chamber and is intercepted by a dynamic air flow sensor 21, for example a fan driven generator whose fan is driven by the moving air 11. So long as air continues to move to the environment, the fan driven generator provides output 22. Output 22 is a dynamic output since it requires that the generator continues to turn. Failure of the generator, the fan, or air flow interrupts output 22—the output becomes static.

The dynamic outputs 15 and 22 are combined in logic device 30. Logic device 30 may take many forms—its essential characteristic is that it provide an output 31 only in the event that dynamic outputs 15 and 22 are both present.

For example, output 15 may be the mechanical switching action of a relay which continuously cycles between two positions. This dynamic action of the relay may cyclically switch the generator voltage of the dynamic air flow sensor and provide a cyclic "on-off" dynamic output 31. Failure of either the dynamic air flow sensor or the dynamic combustion detector interrupts the dynamic characteristic of output 31 of logic device 30.

Reference numeral 50 designates generally a dynamic fuel flow control which receives its control input from output 31. Control 50 includes an inlet area 51, an accumulator area 52 and an outlet area 53. An example of such a dynamic fuel flow control may be found in the copending application of Loren L. Krueger, Ser. No. 566,907, filed July 21, 1966. The above mentioned copending application is a safe leak valve wherein the fuel first moves from the inlet area to the accumulator area, while communication between the accumulator area and the outlet area is blocked. The dynamic "on-off" characteristic of output 31, as it changes to its alternate state, is effective to couple accumulator area 52 to outlet area 53 and to, at the same time, block communication between inlet area 51 and accumulator area 52. Fuel then flows from the outlet area to the combustion environment. In order for fuel to be continuously supplied from the fuel supply to the combustion environment it is necessary that dynamic fuel flow control 50 be subjected to a dynamic output 31, first causing the accumulator to couple with the inlet area and then causing the accumulator to couple with the outlet area. The structure of the above-mentioned copending application provides a safe leak structure in that all leak paths are away from the normal fuel flow path which leads to the combustion environment.

A further example of a dynamic fuel flow control is shown in W. G. Rowell U.S. Patent 3,227,311.

The embodiments of the invention in which an exclusive property or privilege is claimed are defined as follows:

1. A control system for use in controlling the flow of a first reactant into a reaction chamber where the first reactant combines with a second reactant to sustain an existing reaction, comprising:
   means to supply said second reactant to said reaction chamber, a surplus of which may be safely tolerated,
   first dynamic means cooperating with said means to supply said second reactant and providing a dynamic output so long as said second reactant continues to flow to said reaction chamber,
   second dynamic means to supply said first reactant to said reaction chamber,
   dynamic reaction detecting means cooperating with said reaction chamber and providing a dynamic output so long as said existing reaction continuously exists at said reaction chamber,
   and means controlled by said first dynamic means and by said detecting means to provide dynamic control of said second dynamic means and thereby continue said existing reaction only when a dynamic output is provided by both said first dynamic means and said detecting means.

2. A system defined in claim 1 wherein said existing reaction is a combustion environment, said first reactant is fuel, and said second reactant is air.

3. A system as defined in claim 2 wherein said second dynamic means to supply fuel to the combustion environment includes a fuel inlet area and a fuel outlet area, and wherein static control of said second dynamic means interrupts the supply of fuel.

4. A system as defined in claim 3 wherein said second dynamic means to supply fuel to the combustion environment includes an accumulator area, and wherein dynamic control of said second dynamic means causes fuel to be successively moved from said inlet area to said accumulator area and then from said accumulator area to said outlet area.

5. A system as defined in claim 1 wherein said second dynamic means includes an inlet area and an outlet area, and wherein static control of said second dynamic means interrupts the supply of said first reactant.

6. A system as defined in claim 5 wherein said second dynamic means includes an accumulator area, and wherein dynamic control of said first dynamic means causes said first reactant to be successively moved from said inlet area to said accumulator area and then from said accumulator area to said outlet are.

References Cited

UNITED STATES PATENTS

| | | | |
|---|---|---|---|
| 2,282,197 | 5/1942 | Maynard | 158—28 |
| 2,335,471 | 11/1943 | Ashcraft | 158—42.2 X |
| 2,362,258 | 11/1944 | Findley | 126—110 X |
| 2,519,241 | 8/1950 | Findley | 126—110 X |
| 3,276,506 | 10/1966 | Micko | 158—28 |

JAMES W. WESTHAVER, *Primary Examiner.*